Feb. 6, 1940.                W. V. HUTCHINSON                2,189,006
                           MOLDING OF SHEET MATERIAL
                            Filed Oct. 14, 1936           4 Sheets-Sheet 1

INVENTOR
W. V. HUTCHINSON
BY George Hughes
ATTORNEY

Feb. 6, 1940.    W. V. HUTCHINSON    2,189,006
MOLDING OF SHEET MATERIAL
Filed Oct. 14, 1936    4 Sheets-Sheet 2

INVENTOR
W. V. HUTCHINSON
BY George Hughes
ATTORNEY

Feb. 6, 1940. W. V. HUTCHINSON 2,189,006
MOLDING OF SHEET MATERIAL
Filed Oct. 14, 1936  4 Sheets-Sheet 3
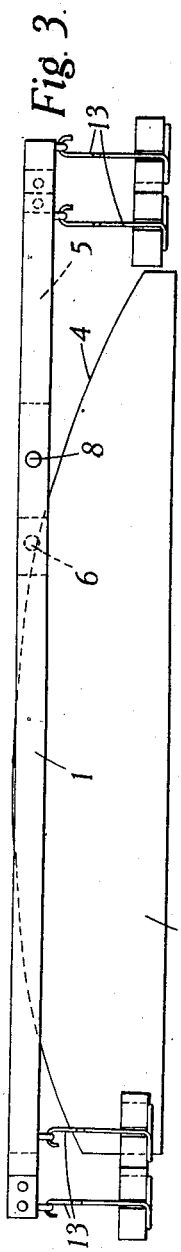
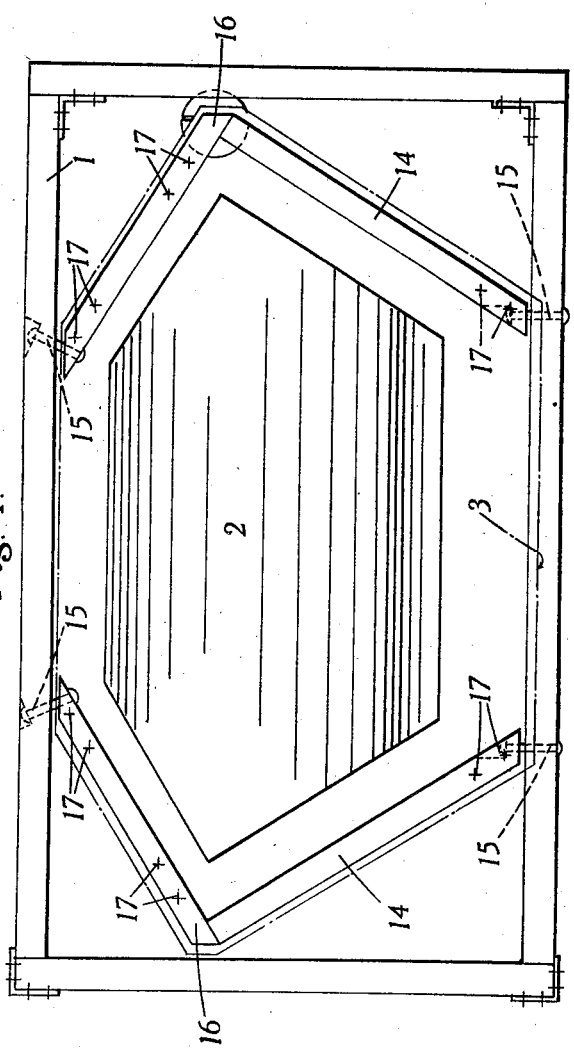
INVENTOR
W. V. HUTCHINSON
BY
ATTORNEY Feb. 6, 1940.  W. V. HUTCHINSON  2,189,006
MOLDING OF SHEET MATERIAL
Filed Oct. 14, 1936  4 Sheets-Sheet 4
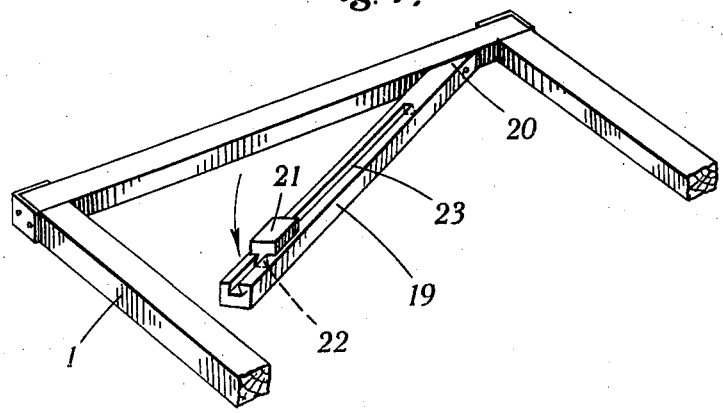
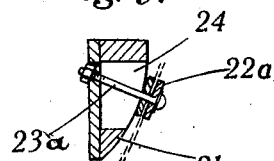
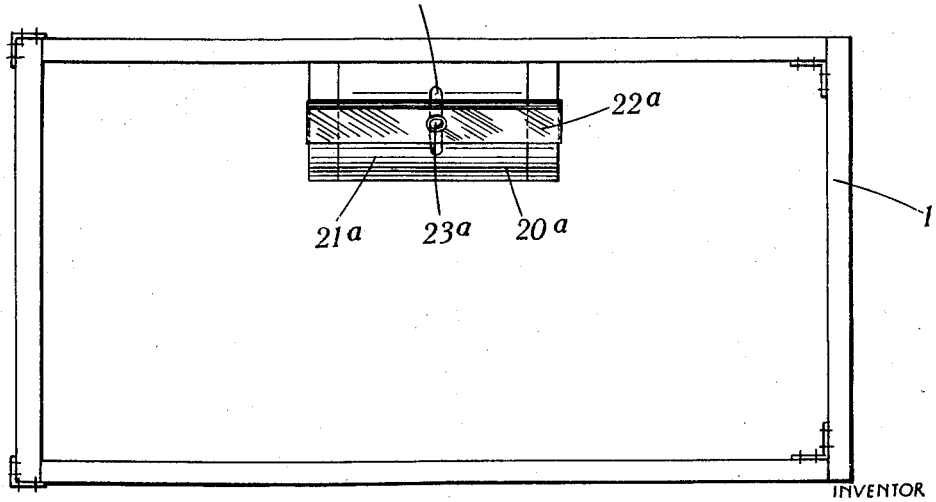
INVENTOR
W. V. HUTCHINSON
BY
ATTORNEY Patented Feb. 6, 1940

2,189,006

UNITED STATES PATENT OFFICE 2,189,006

MOLDING OF SHEET MATERIAL

William Victor Hutchinson, Kingsbury, London, England

Application October 14, 1936, Serial No. 105,522
In Great Britain October 18, 1935

5 Claims. (Cl. 18—19)

The object of this invention is to improve upon the molding of sheet materials, such as for example cellulose acetate, which can be softened by heat or other suitable treatment, and when softened can be distorted to the desired shape. When molding such material into articles bounded by curves, bends, sinuousities and corners it is customary to mount the sheet material in plane form within a frame and to shape it in a mold involving male and female members. Frequently this results in distortion and creases and irregular thickness in the finished article, as the mold parts do not adapt themselves to variations in tension on the sheet material due to corners and bulges. Also the making of both male and female members is expensive. The chief object of this invention is to obviate these disadvantages. Another object of this invention is to facilitate the manufacture of transparent sheets containing bowed, convexed or bulged parts, e. g. as in the production of coupe heads, wind screens, streamlined covers and the like for use on aircraft, so as to obtain various configurations with substantial uniformity of thickness of sheet material without creases, ridges or clouded parts where the distortion or tension is somewhat pronounced.

An important feature of the present invention is to ensure that the plastic sheet material when molded is free from any blemishes and consequently the apparatus used for molding should be particularly adapted for avoiding excessive tension on the plastic sheet material when in the warm, soft condition. For this purpose the mere stretching or pulling of the softened sheet material over the mould, e. g. by tension on springs, somewhat uniformly distributed around the edges of the sheet material, is quite unsatisfactory. The means for supporting the sheet material must adapt itself to the various configurations of molds so as in effect to lay the plastic material smoothly over the mold in the appropriate directions without pulling one part of the sheet material excessively in relation to another part. Arising out of this, the supporting means for the sheet material should have one or more parts, depending upon the shape of the mold, which yield readily without stretching the sheet material, so that the sheet material maintains uniform thickness throughout. It is, of course, known to stretch plastic sheet material over a mold by tension effected by suitable spring or mechanical means, or by a female die member, and it has already been proposed to stretch sheet material such as leather over molds by anchoring the edges of a sheet of leather to bars which are connected by tension springs to an outer frame. Such an arrangement, however, would be quite unsatisfactory for molding cellulose acetate or the like plastic sheet material when it is essential to avoid blemishes and creases in the material, and more particularly when the material should be as transparent as possible, e. g. as on aircraft. Because of the foregoing the present invention provides means for supporting plastic sheet material such as cellulose acetate or like sheet material for use in the molding of such sheet material by heat treatment in which the material is softened and then shaped over a mold, the said means comprising a mold for the molding of the material to the desired shape, a frame adapted to support the sheet material and to be carried over the mold so as to shape the softened sheet material in the frame to the shape of the mold, and a relatively movable element in said frame adapted to receive part of the sheet being molded, so that part of the sheet is supported by the frame and part by said relatively movable element, said latter element being free to move relatively to the plane or level of the frame under the influence of weight applied thereto.

In one example of this invention, assuming that plane sheet of cellulose acetate has to be shaped to form a substantially saddle shaped member having a certain amount of convexity as for example as required for wind screens, nacelle noses and the like for use on aircraft, a male mold member is shaped to form a die or former and the sheet material after heating is supported in a frame which is lowered over the mold or former, and the sheet material is so held at its edges in the frame that some or one of its edges are translatively displaceable relatively to the frame to an extent somewhat proportioned to the tension on the sheet material due to its distortion. This can be effected by providing an oblong or square frame and attaching the desired edge or edges of the sheet to one or greater proportion of sides of the frame, and the remaining edge or edges to a bar or bars translatively and/or pivotally movable relatively to the frame.

The sheet material has bars of wood clamped to opposite faces of it, or single bars nailed to one face when it is inserted in the heating oven and these bars can be clamped in the frame during molding. They also serve to insulate the sheet material at the points where it is attached to the said frame or otherwise receive tension.

An important feature of the present invention is that in order to obtain a great amount of flexibility of the sheet material at the points of anchorage during molding, means is provided whereby a movement of translation in two dimensions is available for one or more points of anchorage of the sheet material. For example, some articles have to be molded to such exaggerated curves and corners, that a large amount of flow of the material at certain parts in relation to adjacent parts is necessary. This two dimensional movement can be effected by anchoring the desired parts of the edges of the sheet material to blocks which are slidable longitudinally relatively to one or more bars hinged or slidably mounted in the frame. The blocks can have dovetail projections engaging in correspondingly sectioned channels in the appropriate bars. The bar or bars carrying the sliding blocks can each slide relatively to the frame in a direction transverse to its longitudinal direction, e. g. by depending from a sectional bar or block or pin slidable in a slotted lug projecting inwards from one side of the frame. Suitable spring means, or weighted cords can yieldingly oppose movement of the pivoted or slidable bar or bars, and the said dovetail projections can have a close sliding fit to obtain a certain amount of friction. Also tension springs can be anchored to the sliding blocks to yieldingly oppose sliding of the blocks.

The apparatus according to this invention can be employed successfully with cellulose acetate or like plastic or thermoplastic sheet material of various thicknesses, for example, 20, 40, 60 and 80 thousandths of an inch or more.

In order that my invention may be clearly understood and readily carried into effect I have appended hereto four sheets of drawings somewhat diagrammatically illustrating the molding of variously shaped sheet members, and wherein:

Fig. 3 is a side elevation of Fig. 1 to show the contour of the mold.

Fig. 4 is a plan view showing the molding of a transparent sloping front window part of an aeroplane fuselage.

Fig. 7 is a detail perspective view showing a modification in which the points of support of the sheet material being molded have movements of translation additionally to the movements obtained by reason of the moving parts of the frame.

Fig. 8 is a plan view, and

Fig. 9 is a broken sectional side elevation view showing a still further method of obtaining yielding movement of an edge of the sheet material during molding.

Figure 1:
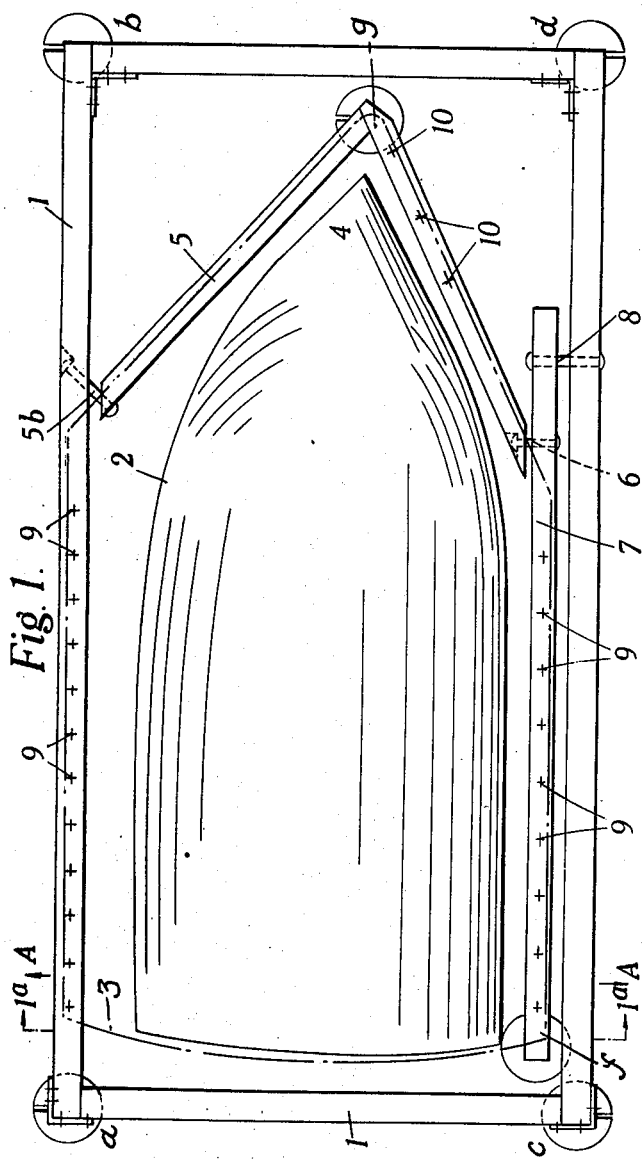
Fig. 1 is a plan view showing the molding of a transparent coupe head suitable for an Avro Anson aeroplane.
Figure 2:
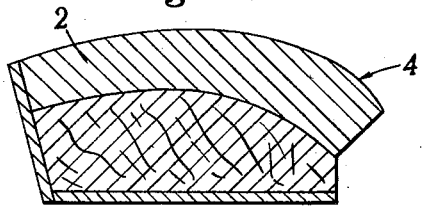
Fig. 2 is a section on the line 1a—1a of Fig. 1.

Referring to the drawings, in the arrangement shown in Figs. 1 and 2 an outer oblong frame 1 is adapted to be lowered over a mold 2 composed of wood, plaster of Paris, or other suitable material. The frame carries a sheet of heated plastic material such as cellulose acetate, the boundary edges of which are indicated by the dotted lines 3. The mold shown in Fig. 1 is suitable for forming a coupe head and as shown in Fig. 2, it is of arcuate cross-section, whilst as shown in Fig. 3 it is also of arcuate longitudinal section having a suitable curved nose 4 of somewhat V-shape in plan.

In order to bend the sheet material accurately to the shape of the mold without forming therein creases, irregular thicknesses, or cloudy markings, it is desirable that the points of anchorage of the sheet material to the frame shall at appropriate parts yield to conform with the variations in tension and directions of stretching of the sheet material to the frame 1 at points all of which are fixed relatively to the frame, I provide within the frame 1 a suitable number of relatively adjustable parts arranged to conform approximately with the outline of the predetermined parts of the mold, and to these parts some of the edges of the sheet material are attached. For forming the coupe head shown in Fig. 1, I provide a V-shaped frame member 5 which pivots on bolts or other suitable axes 5b and 6 opposite sides of the frame, these axes 5b and 6 being inclined to conform with the angle of movement of the two limbs of the member 5. In the drawings as shown, it is preferred that the pivots 6 shall also have a movement of translation relatively to the frame 1, for which purpose it is passed through a longitudinal bar 7 and not through an adjustable side member of the frame 1. This bar 7 is pivoted at one end to a bolt or other suitable member 8, this pivoted end of the bar 7 being prolonged slightly beyond the pivot 6. The bar 7 is free to pivot about the bolt 8, and the sheet material is affixed to the bar 7 by one edge, the opposite parallel edge being affixed to the longitudinal side member of the frame 1, the points of anchorage being indicated by a series of crosses 9. The anchorage can be effected by nails or longitudinal bars between which the edges of the sheet material are gripped, the bars being carried by the appropriate frame members. The sheet material is cut approximately to the outline of the mold, and one edge is affixed at the points 10 to one limb of the V-shaped member 5, which is pivoted to the bar 7. The sheet material is not fixed to the other limb of the V-shaped member 5.

Figure 5:
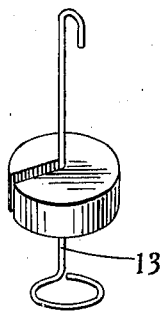
Fig. 5 shows one of a plurality of hooked rods adapted to carry weights and to be suspended from the frames carrying the sheet material during molding.
Figure 6:
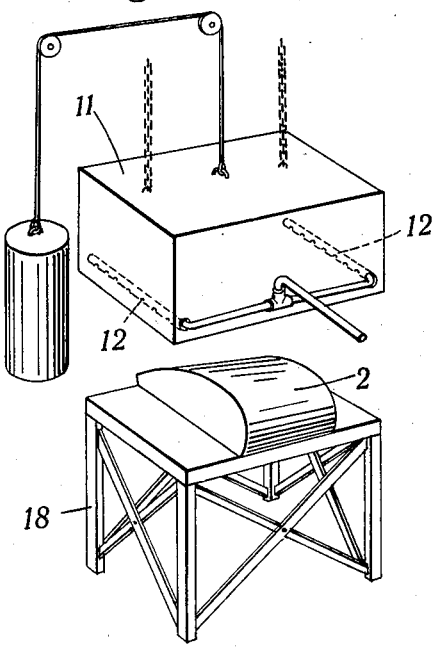
Fig. 6 is a diagrammatic view showing combined heating and molding apparatus.

When the sheet material is mounted in the manner described, the frame is placed over the mold 2 and weights are attached at the corners a, b, c, and d. The free end f of the bar 7 is temporarily tied by string or secured by a releasable catch to the adjacent longitudinal frame member. A hood 11 (see Fig. 6) is then lowered over the mold and frame, this hood being an inverted sheet metal box in which are located suitable heating means, e. g. Bunsen burners 12. The weights are attached to the corners a, b, c and d, by hook shaped rods 13 such as shown in Fig. 5, and additional hook shaped rods are attached to the points f and g. The point g may be temporarily tied or fastened to the adjacent transverse frame member, so that the hooked rods attached to the points f and g may be weighted, but the weights will have no effect until the string or other fastening means is cut or released. When the material reaches a predetermined temperature, so that it is sufficiently plastic to be molded, the weighted points f and g are released, and the sudden tension results in the sheet material being shaped to the outline of the mold without forming creases or irregular thickness parts therein. The sheet material is secured to the upper edges of the frame members, and it is preferred to clamp the edges of the sheet material between narrow strips of wood or other suitable material secured by screws or other clamping members to the appropriate frame members.

In the arrangement shown in Fig. 4 the same method as previously described is adopted. That is to say, the sheet material is secured at suitable points within the frame 1 in such manner that during the preliminary heating the various parts of the frame are relatively immovable. The mold 2 shown in Fig. 4 has a transverse logitudinal curvature with two V-shaped ends and therefore a pair of V or L shaped frame members 14 are pivoted at their ends on axes 15. The apices 16 of the two frame members 14 are temporarily secured to the end members of the outer upper frame 1, and the sheet material to be molded is secured at the parts indicated by the crosses 17 to the members 14. The frame 1 is weighted at its corners as previously described, and when the sheet material is sufficiently soft by reason of the heat treatment the corners 16 of the two frame members 14 are released, and these corners being weighted causes the sheet material to assume the configuration of the mold. By leaving the edges of the sheet material free at a number of points a substantial amount of yield is obtained which prevents tearing and distortion within the predetermined shape. In addition to obtaining yield in this manner the pivot 8 can fit loosely in the bar 7, and also some of the pivots 15 can loosely fit in the frame members 14.

The mold 2 is placed upon a suitable pedestal 18 and the hood 11 is adapted to close the upper end of the pedestal 18 when lowered thereover.

In the arrangement shown in Fig. 7, instead of securing the sheet material relatively fixedly to a bar 19 which pivots at one end 20 relatively to the frame 1, I provide sliding blocks 21 having dovetail section projections 22 which slide in corresponding channels 23 in the bar 19. The sheet material is secured at the desired points, to the blocks 21 and consequently in addition to the yielding movement obtained by the bar 19 during molding the sheet material can bend more freely about a steeply curved mold by reason of the sliding movement of the blocks 21. The sliding blocks 21 can be adopted with many forms of molding frames, e. g. they can be adopted in the V shaped end members 5 and 14 shown in Figs. 1 and 4.

In the arrangement shown in Figs. 8 and 9 the outer frame 1 carries on one or more of its sides an inwardly projecting block 20a having a curved upper face 21a along which is disposed a longitudinal pair of bars 22a between which one edge of the sheet material is gripped, the other edges being secured to suitable parts of the frame 1 or longitudinal movable bars disposed within the frame. The clamping bars 22a are secured by a bolt 23a which is free to pivot about the head which abuts against the lower face of the block 20a.

For this purpose the block 20a is provided with a slot 24. By adjusting the nut of the bolt 23a, the frictional resistance to movement of the clamping bars 22a can be varied. The clamping bars 22a will be weighted by hooked rods at its ends or other suitable means in addition to weighting the frame 1, and by this means the sheet material can be bent about a steeply curved mold, and the freedom of movement of the edges clamped by the bars 22a can be predetermined to ensure that the sheet material will follow the desired curvature without excessive strain thereon.

It will be realised that by means of the present invention a plane or substantially plane sheet of material is supported in a frame at parts of its periphery which in the finished article do not lie substantially out of the plane of the material. At any part where substantial deviation from the plane of the material is to be effected, the material is secured in a movable frame or clamp. The main frame is disposed over a male die and is loaded so as to force the material over the contour of the die. The sheet of material carried by the frame is softened, conveniently by the application of heat, so that the loading of the frame causes the material to follow the convexity of the die.

By reason of the part or parts required to undergo considerable deviation being secured to the clamp or clamps and free to move with respect to the main frame, the material controlled by the clamp or clamps is drawn smoothly into position, thus avoiding stretching of the material over the parts where considerable convexity arises. Thus, where transparent material is employed, the material is not subjected to stresses tending to impair the transparency and in any case the strength of the material is substantially maintained over the whole area of the article.

It will be seen that the invention involves the use of a male die only. This results in a considerable saving over the methods involving shaping of the material between two mating dies. Further, in the production of transparent articles the invention avoids the nipping of the material between two dies, which tends seriously to affect the transparency of the material.

The mounting of the material in a substantially plane frame facilitates the necessary softening, since the material can be subjected to the action of the heating elements 12 in the hood 11 which thereby functions as an oven which distributes heat substantially uniformly over the plane and provides for uniform softening of the material.

The molding operation is of very gentle character and this allows the material to be softened only to a slight extent, in fact so slightly that any tendency of the material to take up minor irregularities of the surface of the die can be avoided.

Where two or more movable clamps are provided for the same part of the material, these may be arranged to operate independently where the shape of the articles necessitates it. Thus, one clamp may first be loaded to draw the material in one direction, after which a second clamp is loaded to give an additional drawing of the material in another direction.

The present invention is also applicable to molding sheet material by pressure between die and matrix, because the sheet material can be held in a frame over the matrix and the die, and then lowered. The movable part or parts of the frame will allow the sheet material to flow in steeply curved parts or depressions in the matrix. Upon depression of the dies, the movable clamp is free to follow the material that is pressed well out of the plane of the frame, so that the tendency of the dies to stretch or tear the material is overcome. At the same time, the movable clamp, by holding a length of relatively unsoftened material undergoing a large amount of flow, allows this portion of the material to be forced smoothly into the shape of the dies.

Between the portion of the margin held by the movable clamp and adjacent portions of the margin secured to the frame, unsupported lengths may be left to allow for the large flow of the material adjacent the movable clamp. The material in these unsupported lengths may stretch or tear, but this is immaterial, since they are trimmed away from the completed article along with the rest of the margin.

What I claim is:

1. Means for supporting cellulose acetate or other thermo-plastic material in sheet form during treatment in which the material is softened by heat and shaped over a mold, comprising an open frame having means thereon to secure thereto part of the perimeter of the sheet material to be molded, a member having means thereon to secure another part of the perimeter of the sheet material thereto, said member being hingedly connected to and movable freely in relation to the open frame, and weighted means connected to said member in order to move the part of the sheet material connected to said member over the mold relatively to the part of the sheet material connected to the open frame.

2. Means for supporting cellulose acetate or other thermo-plastic material in sheet form during treatment in which the material is softened by heat and shaped over a mold, comprising an open frame having means thereon to secure thereto part of the perimeter of the sheet material to be molded, a member connected to said open frame and freely movable relatively thereto, weighted means secured to and a slidable member carried by said relatively movable member, said slidable member being free to slide on said relatively movable member and having means thereon to secure thereto another part of the perimeter of the sheet material.

3. Means for supporting cellulose acetate or other thermo-plastic material in sheet form during treatment in which the material is softened by heat and shaped over a mold, comprising an open frame having means thereon to secure thereto part of the perimeter of the sheet material to be molded, a V shaped member pivotally supported at its ends to opposite sides of the said frame and free to swing relatively to the frame and means on said member to secure thereto other parts of the perimeter of the sheet material.

4. Means for supporting cellulose acetate or other thermo-plastic material in sheet form during treatment in which the material is softened by heat and shaped over a mold, comprising an open frame having means thereon to secure thereto part of the perimeter of the sheet material to be molded, a plurality of bars pivotally supported in said frame, a plurality of members carried by said bars and slidable relatively thereto and means on said members to secure thereto other parts of the perimeter of the sheet material.

5. Means for supporting cellulose acetate or other thermo-plastic material in sheet form during treatment in which the material is softened and shaped over a mold, comprising an open frame having means thereon to secure thereto part of the perimeter of the sheet material to be molded, a support secured to and projecting inwardly from one side of the frame, said support having a face inclined in relation to the plane of the frame, and a member slidable upon said inclined surface and having means thereon to secure thereto another part of the perimeter of the sheet material.

WILLIAM VICTOR HUTCHINSON.